Figure 1:
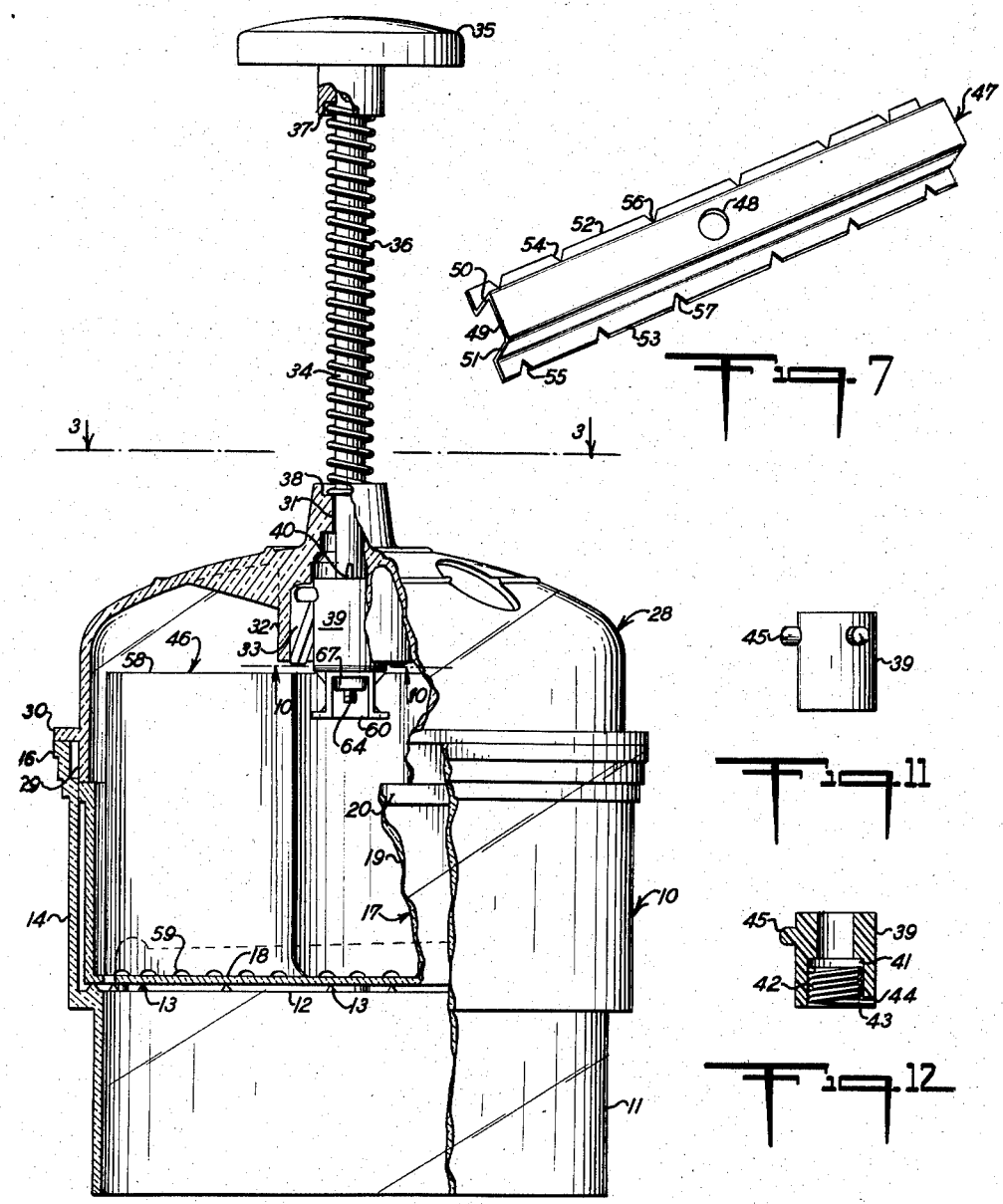

July 21, 1959

N. K. MORRIS 2,895,520

FOOD CHOPPER

Filed Aug. 27, 1957

3 Sheets-Sheet 1

INVENTOR
NATHAN K. MORRIS

BY

ATTORNEYS

July 21, 1959

N. K. MORRIS 2,895,520

FOOD CHOPPER

Filed Aug. 27, 1957

3 Sheets-Sheet 3

INVENTOR
NATHAN K. MORRIS

BY Jacobi & Jacobi

ATTORNEYS

United States Patent Office 2,895,520
Patented July 21, 1959

2,895,520
FOOD CHOPPER
Nathan K. Morris, Avon by the Sea, N.J.

Application August 27, 1957, Serial No. 680,449

6 Claims. (Cl. 146—160)

This invention relates to apparatus for treating food products and more particularly to a food chopper of the type shown in patent to Zysset No. 2,782,826 and patent to Popeil No. 2,787,308 and this invention represents an improvement over the structures shown in these patents.

Food choppers of the type with which this invention is concerned and the type shown in the above mentioned patents commonly include a cylindrical shell or body member which is positioned over food products to be chopped and such chopping is accomplished by a vertically reciprocating knife which operates to cut or shred the food products and there is also provided means for rotating the knife in a step-by-step manner during operation thereof in order to bring the knife into engagement with different portions of the food products. This type of food chopper is also commonly provided with a stripper element which operates to strip particles of the food products being cut or chopped which may adhere to the knife blade and this stripper element is normally mounted in the shell or body member to rotate therein in a step-by-step manner, together with the knife. Since the cutter is operated manually and since the step-by-step rotary movement of such cutter is normally provided by a compression spring, it will be obvious that friction between the various parts should be reduced to a minimum in order to permit satisfactory operation of the apparatus and furthermore, since devices of this nature are normally sold in a highly competitive market, it is extremely important that the structure of the apparatus permit of mass production in order that manufacturing costs may be maintained at a minimum. A still further consideration in devices of this type is the necessity of assembling the various parts after use and cleaning thereof, these parts normally comprising the shell or body, the stripper element and the cover and cutting blade assembly. Since the cutting blade is normally sinuous in configuration and since, such blade passes through a corresponding sinuous slot in the stripper element, assembly of these parts is frequently quite difficult and time consuming, since the blade must be substantially perfectly aligned with the slot in the stripper element before assembly of the parts can be completed.

It is accordingly an object of the invention to provide a food chopper utilizing a reciprocating and step-by-step rotating cutting blade which may be conveniently and economically manufactured from readily available materials and which is particularly suited to mass production thereby permitting sale in a highly competitive market.

A further object of the invention is the provision of a food chopper, of the character described, in which the assembly of the cutter blade and the supporting structure therefor is facilitated in order to maintain the manufacturing costs of the device at a minimum.

A still further object of the invention is the provision of a food chopper of the character described, and including a reciprocating and step-by-step rotating cutter blade there being also provided a stripper element rotatably mounted in a body of shell, which stripper element rotates with the cutter blade and in which means is provided to reduce friction between the stripper element and the body shell.

Another object of the invention is the provision of a food chopper, including a body shell, a stripper element rotatably mounted in the body shell and a reciprocating cutter blade passing through a slot in the stripper element and in which means is provided on the stripper element to facilitate alignment of the cutter blade with the slot in such element.

A further object of the invention is the provision of a food chopper of the character described, which may be conveniently disassembled for cleaning purposes and thereafter reassembled by relatively simple manual operations and without necessitating accurate manual alignment of the various parts.

Figure 2:
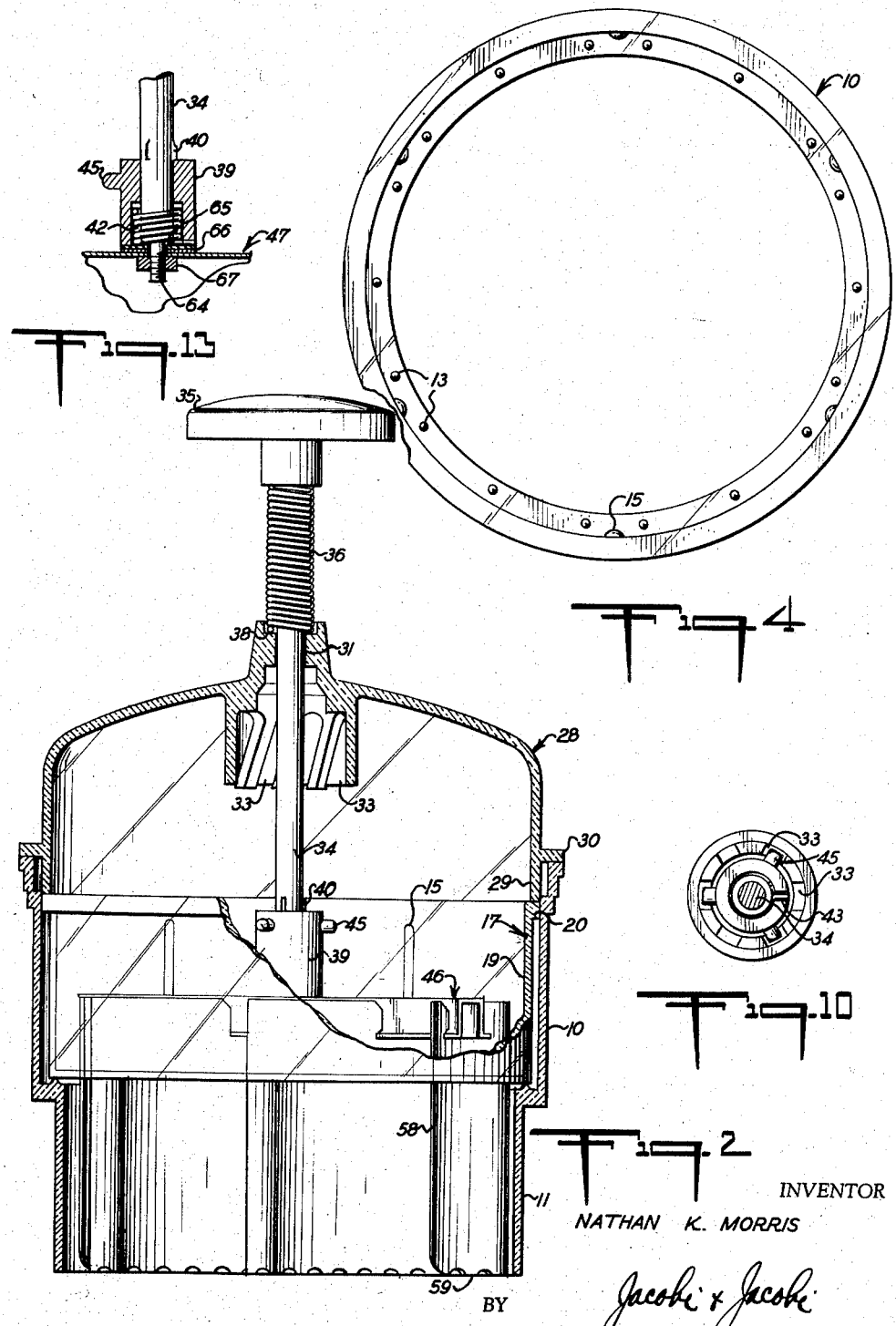
Figure 3:
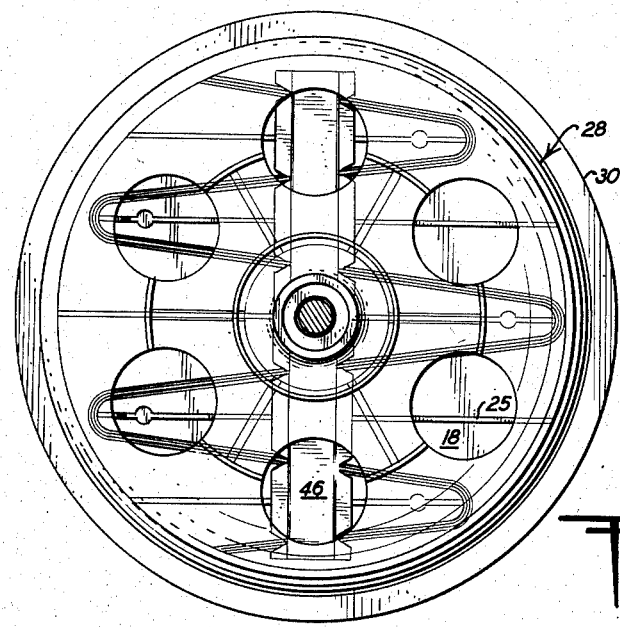
Figure 6:
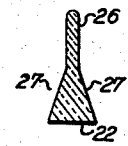
Figure 8:
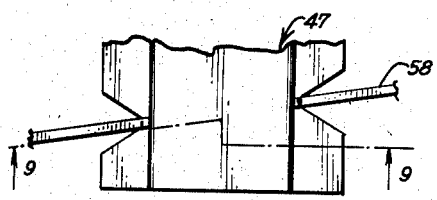
Figure 9:
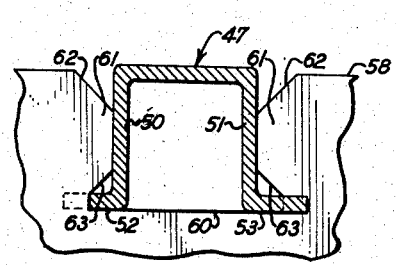
Figure 5:
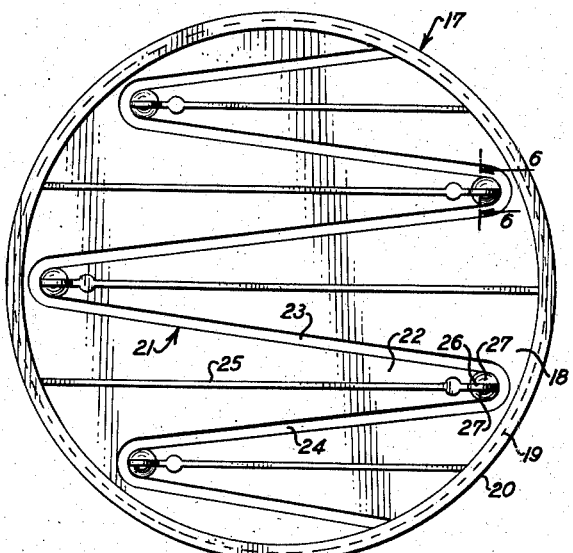

Further objects and advantages of the invention will be apparent from the following description taken in conjunction with the accompanying drawings wherein:

Fig. 1 is a side elevational view with parts broken away and in section for greater clarity and showing a food chopper constructed in accordance with this invention;

Fig. 2 a vertical sectional view of the food chopper shown in Fig. 1 and showing the cutter blade in cutting position;

Fig. 3 a sectional view taken substantially on the line 3—3 of Fig. 1, but omitting the compression spring shown in Fig. 1;

Fig. 4 a top plan view of the body shell utilized in the food chopper of this invention and with the stripper element removed therefrom;

Fig. 5 a top plan view of the stripper element and showing the slot for slidably receiving the cutter blade;

Fig. 6 a fragmentary sectional view taken substantially on the line 6—6 of Fig. 5 and showing the means provided on the stripper element for facilitating alignment of the cutter blade with the slot in the stripper element;

Fig. 7 a view in perspective showing the channel member utilized for securing the cutter blade to the reciprocating push rod;

Fig. 8 is a fragmentary top plan view of a portion of the channel member shown in Fig. 7 and further showing a portion of the cutter blade mounted on the channel member;

Fig. 9 a sectional view taken substantially on the line 9—9 of Fig. 8 and showing the manner of securing the cutter blade to the channel member;

Fig. 10 a fragmentary sectional view taken substantially on the line 10—10 of Fig. 1 and showing the drive mechanism for rotating the pushrod and cutter blade in a step-by-step manner;

Fig. 11 a side elevational view of the drive sleeve for the pushrod and cutter blade assembly;

Fig. 12 a vertical sectional view of the drive sleeve shown in Fig. 11 and showing the manner of installing a spiral spring therein to provide a one-way clutch; and Fig. 13, a fragmentary sectional view showing the drive sleeve of Fig. 11 installed on the pushrod and the relationship of the spiral spring providing a one-way clutch to such pushrod.

With continued reference to the drawing, there is shown a food chopper constructed in accordance with this invention and which may well comprise a cylindrical body shell 10 which may be conveniently molded from plastic or any other suitable material or may be manufactured in any other desired manner. The body shell 10 is open at the top and bottom ends and the lower portion 11 thereof is reduced in diameter and terminates substantially midway of the length of the shell 10 in an upwardly facing annular shoulder 12 there being a plurality of angularly spaced upwardly extending projections 13 on the shoulder 12, the purpose of which will be later described. The upper portion 14 of the shell 10 is enlarged and is provided with angularly spaced axially extending ribs 15 on the inner surface thereof, such ribs being of less depth than the width of the shoulder 12. The shell 10 may terminate at the upper end in an outwardly extending annular flange 16.

As best shown in Figs. 1, 2 and 5, there is provided a stripper element 17 which as shown, may comprise a bottom wall 18 and a cylindrical sidewall 19 terminating at the upper edge in an outwardly extending annular flange 20. As best shown in Figs. 1 and 2, the stripper element 17 is rotatably supported in the upper portion 14 of the body shell 10 and the stripper element 17 rests upon the upwardly extending projection 13 and is faced from the inner surface of the inner portion 14 of the body shell 10 by the axially extending ribs 15, as well as the annular flange 20. In this manner, contact between the stripper element 17 and the body shell 10 is reduced to a minimum and consequently friction between these members is reduced and furthermore the tendency of food products to lodge between these members and impede rotation of the stripper element 17 with relation to the body shell 10 is substantially reduced. By reason of the structure, above described, there is provided a substantially line contact between the stripper element 17 and the body 10 and such contact will provide substantially less friction than would be the case if there was a surface contact between these parts.

As best shown in Fig. 5, a sinuous slot 21 is provided in the bottom wall 18 of the stripper element 17 and it should be noted that sinuous slot 21 results in providing tapered tongues 22 between adjacent portions 23 and 24 of the slot 21. Each tongue 22 is provided with a reinforcing rib 25 on the upper surface thereof and each rib 25 terminates at the free end of the tongue 22 in an upwardly extending tapered ear 26, which as best shown in Fig. 6 is provided with inclined sides 27 merging into the end and side edges of the tongue 22. The purpose and operation of the tapered ears 26 will be later described.

A generally dome-shaped cover 28 is provided for the body shell 10 and stripper element 17 and the cover 28 may be formed of a molded plastic or any other suitable material, or may if desired, be formed in any other suitable manner. A skirt portion 29 on the cover 28 is received within the upper portion of the body shell 10 and an outwardly extending annular flange 30 on the skirt portion 29 of the cover 28 engages the flange 16 on the upper edge of the body shell 10 to removably support the cover 28 thereon. The cover 28 is provided with a centrally located vertical aperture 31 and a downwardly extending hollow boss 32 on the inner surface of the cover 28 and concentric with the aperture 31, there being a plurality of spiral grooves 33 in the inner surface of the boss 32.

A pushrod 34 is slidably received in the aperture 31 in the cover 28 and a hand engaging knob 35 fixed on the upper end of the pushrod 34 serves to retain a compression spring 36 disposed on said rod between the lower surface 37 of the knob 35 and an upper surface 38 of the cover 28. Rod rotating mechanism is provided in the form of a sleeve 39 rotatably received on the rod 34 adjacent the lower end thereof and upward movement of the sleeve 39 on the rod 34 is prevented by upset portions 40 on the rod 34 and downward movement of the sleeve 39 is prevented by a structure to be later described. As best shown in Figs. 12 and 13, the sleeve 39 is provided with a counterbore 41 within which is disposed a spiral spring 42 which closely embraces the rod 34 as shown in Fig. 13. One end 43 of the spring 42 is disposed in a notch 44 in the lower edge of the sleeve 39 to prevent relative rotation between the spring 42 and the sleeve 39. The spiral spring 42 operates as a one-way clutch to drive the pushrod 34, but the sleeve 39 is rotated in one direction and to permit rotation of the sleeve 39 with relation to the pushrod 34 when the sleeve 39 is rotated in the opposite direction. The sleeve 39 is provided with a plurality of radially projecting studs 45 which slidably engage in the spiral grooves 33 in the boss 32 to rotate the sleeve 39 in a step-by-step manner, as will be later described.

A cutter blade assembly 46 is secured to the lower end of the pushrod 34 and such assembly may well comprise a downwardly facing channel member 47 provided with an aperture 48 in the web 49 intermediate the length of the channel member 47, the legs 50 and 51 of the channel member 47 being provided at their lower edges with outwardly extending flanges 52 and 53 respectively flange 52 being provided with notches 54 and flange 53 with notches 55 and it is to be noted, that the notches 54 are offset from the notches 55. It is further to be noted, that the inner ends 56 of the notches 54 and the inner ends 57 of the notches 55 terminate outwardly of the side surfaces of the legs 50 and 51 of the channel member 47.

A one-piece sinuous knife blade 58 is formed of any suitable material, such as stainless steel, is provided with a serrated lower cutting edge 59 and the upper edges of the cutting blade 58 are provided with aligned slots 60. As best shown in Figs. 1 and 9, the slots 60 in the upper edges of the knife blade 58 are provided with inwardly extending opposed locking ears 61 on the side edges of the slots 60 and the upper surfaces of the ears 61 are beveled, as shown at 62, while the lower surfaces of the ears 61 are also beveled as shown at 62.

As best shown in Figs. 8 and 9, the channel member 47 is assembled with the knife blade 46 by disposing either the flange 52 or the flange 53 in the slots 60 with the flange disposed below the adjacent ear 61 and with the blade 58 engaging in the appropriate notches 54 or 55 in the flanges 52 or 53. The upper beveled surface 62 will thereby facilitate movement of the other leg of the channel member 47 downwardly and such leg will spring inwardly to permit passage of the other flange over the inner end of the ear 61 until the flange snaps beneath such ear 61 with the edge of the slot 60 engaging in the appropriate notch 54 or 55. In this manner, the blade 58 is securely locked on the channel member 47 and since the notches 54 and 55 are offset as described above, the edges of the blade will be aligned with and engage therein and furthermore, since the inner ends 56 and 57 of the notches 54 and 55 terminate outwardly of the legs 50 and 51 of the channel member 47, the ears 61 will be disposed above a portion of the flanges 52 and 53 thereby preventing inadvertent separation of the knife blade 58 from the channel member 47. If desired, however, the channel member 47 may be removed from the knife blade 58 by springing one of the legs of the channel member inwardly and tilting the same upwardly, at which time the beveled surfaces 63 will facilitate removal of the channel member 47 from the slots 60 in the upper edges of the blade 58. The channel member 47 would, however, normally remain in position in the slots 60 to provide the complete blade assembly 46.

As best shown in Figs. 1 and 13, the pushrod 64 is provided at the lower end thereof with a reduced threaded stud 64 and this stud terminates in a shoulder 65 on the lower end of the pushrod 34. One or more washers 66 are positioned on the stud 64 in engagement with the shoulder 65 and the stud 64 extends through the aperture 48 in the web 49 of the channel member 47 with a nut 67 threadedly received on the stud 64 within the channel member 47 to secure such channel member to the pushrod 34. It is to be noted, that the shoulder 65 is located slightly below the lower edge of the sleeve 39 and consequently the washers 66 when clamped in firm engagement with the shoulder 65 prevent downward sliding movement of the sleeve 39 on the pushrod 34, but permit relative free rotation of the sleeve 39 on the pushrod 34.

In utilizing the food chopper of this invention, the same is assembled with the stripper element 17 disposed within the upper portion 14 of the body shell 10 and with the stripper element 17 supported on the projections 13 on the shoulder 12 in the body shell 10. The dome-shaped cover 28 and cutter blade assembly 46 carried thereby is assembled with the body shell 10 with the blade 58 substantially in alignment with the sinuous slot 21 in the bottom wall 18 of the stripper element. It will be noted, that in this assembled position, the reinforcing ribs 25 on the tongues 22 of the stripper element 17 are disposed between adjacent portions of the cutter blade 28 and by reason of the tapered configuration of the ears 26 on the tongues 22, the cutting edge 59 of the blade 58 will be guided into registry with the sinuous slot 21 upon downward movement of the blade 58 thereby insuring that the blade 58 will freely pass through the slot 21 during operation of the device.

The lower portion 11 of the body shell 10 is placed over the food to be chopped which has in turn been placed on a suitable supporting surface and the cutter blade 58 is moved downwardly by engagement of the hand of the operator with the knob 35 secured to the upper end of the pushrod 34. Downward movement of the pushrod 34 will result in moving the cutter assembly 46, as well as the drive sleeve 39 downwardly and since the radially projecting studs 45 are engaged in the spiral grooves 33 of the boss 32 on the cover 38, the sleeve 39 will be rotated, but due to the presence of the spiral spring 42 which provides a one-way clutch, the sleeve 39 will freely rotate on the rod 34 and consequently the rod 34 and cutter assembly 46 carried thereby will not rotate during downward movement thereof.

Upon completion of the cutting stroke, the rod 34 and cutter assembly 46 is allowed to move upwardly under the action of compression spring 36 and upon engagement of the radially projecting studs 45 with the spiral grooves 33, the sleeve 39 will be rotated in the opposite direction and through the clutch provided by the spiral spring 42 will rotate the rod 34 and cutter assembly 46 through an arc determined by the pitch of the spiral grooves 33. It will, therefore, be seen that this structure results in imparting a step-by-step rotary movement to the rod 34 and cutter assembly 46 as the rod and cutter assembly are reciprocated and furthermore, this step-by-step rotation will result in rotating the stripper element 17 in the same step-by-step manner. Since the stripper element 17 is supported on the projections 13 and further, since stripper element is spaced from the sidewall of the upper portion 14 of the body shell 10 by the axial or vertical ribs 15, friction between the stripper element 17 and the body shell 10 is reduced to a minimum and rotation of the stripper element 17, cutter assembly 46 and pushrod 34 will be relatively unimpeded. If only a surface contact were provided between the stripper element 17 and the body shell 10, it could well happen that juices from the food products being operated upon would seep between such surfaces and dry thereby either adhesively securing such surfaces together against relative rotation or introducing substantial friction which would tend to impede the rotation of the stripper element. Since the force available to rotate the stripper element is determined by the compression spring 36 and since such spring must be compressed by the operator, it is desirable to utilize as weak a spring as possible and consequently reduction of friction between the stripper element 17 and the body shell 10 represents a material advantage.

As will be seen from the above, the various main parts of the device may be disassembled to facilitate cleaning thereof thereby maintaining the device in a sanitary condition and reassembly of such parts is facilitated by the formation of the ears 26 on the tongues 22 of the stripper element 17 and consequently the task of aligning the cutter blade 58 with the slot 21 in the stripper element 17 is rendered comparatively easy. Furthermore, the manner in which the channel member 47 is secured to the cutter blade 58 materially facilitates manufacture and assembly of this portion of the device thereby reducing the cost of production and permitting sale of the device in a highly competitive market.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A food chopper comprising a cylindrical body shell open at the top and bottom ends, an internal upwardly facing annular shoulder in said shell substantially midway of the length thereof, angularly spaced axially extending ribs on the inner surface of said shell above said shoulder, said ribs being of less depth than the width of said shoulder, upwardly extending angularly spaced projections on said shoulder, a stripper element comprising a bottom wall, a cylindrical sidewall, said element being rotatably supported in said shell on said projections and being spaced from the inner surface of said shell by said ribs, a sinuous slot in said bottom wall providing tapered tongues between adjacent portions of said slot and a reinforcing rib on the upper surface of each tongue, each rib terminating at the free end of the tongue in an upwardly extending tapered ear with the lower sides of said ear merging into the end and side edges of the tongue, a generally dome-shaped removable cover for said shell and stripper element, said cover having a skirt portion received within the upper end of said shell, an outwardly extending annular flange on said skirt portion engaging the upper edge of said shell to support said cover thereon, said cover having a centrally located vertical aperture, a downwardly extending hollow boss on said cover concentric with said aperture and a plurality of spiral grooves in the inner surface of said boss, a pushrod slidably received in said aperture, a hand-engaging knob on the upper end of said rod, a compression spring on said rod between said knob and the upper surface of said cover, a rod rotating mechanism comprising a sleeve rotatably received on said rod adjacent the lower end, means for preventing axial movement of said sleeve on said rod, a counterbore in said sleeve, a spiral spring disposed in said counterbore and embracing said rod, one end of said spiral spring being fixed to said sleeve to provide a one-way clutch, whereby upon rotation of said sleeve in one direction said rod will be rotated through said spiral spring and upon rotation of said sleeve in the opposite direction said rod will remain fixed and radially projecting studs on said sleeve engaging said spiral grooves to rotate said sleeve upon reciprocation of said rod and a cutter blade assembly fixed to the lower end of said rod, said assembly comprising a downwardly facing channel member secured intermediate the length thereof to the lower end of said rod, outwardly extending flanges on the lower edges of the legs of said channel member, opposed pairs of notches in said flanges with the notches in one flange being offset from the notches in the opposite flange, the inner ends of said notches terminating outwardly of the side surfaces of said channel member, a one-piece sinuous knife blade having a serrated lower cutting edge, aligned slots in the upper edges of said blade and inwardly extending opposed locking ears on the side edges of said last named slots, the upper and lower surfaces of said ears being beveled, said channel member being disposed in said aligned slots with said ears extending inwardly over said flanges in alignment with said notches to lock said blade on said channel member, said blade being slidably received in the slot in said stripper element and said stripper element being rotatable with said blade.

2. A food chopper comprising a cylindrical body shell open at the top and bottom ends, an internal upwardly facing annular shoulder in said shell substantially midway of the length thereof, angularly spaced axially extending ribs on the inner surface of said shell above said shoulder, said ribs being of less depth than the width of said shoulder, upwardly extending angularly spaced projections on said shoulder, a stripper element comprising a bottom wall, a cylindrical sidewall, said element being rotatably supported on said shell on said projections and being spaced from the inner surface of said shell by said ribs, a sinuous slot in said bottom wall providing tapered tongues between adjacent portions of said slot and a reinforcing rib on the upper surface of each tongue, each rib terminating at the free end of the tongue in an upwardly extending tapered ear with the lower sides of said ear merging into the end and side edges of the tongue, a removable cover for said shell and stripper element, said cover having a centrally located vertical aperture, a downwardly extending hollow boss on said cover concentric with said aperture and a plurality of spiral grooves in the inner surface of said boss, a pushrod slidably received in said aperture, a hand engaging knob on the upper end of said rod, the compression spring on said rod between said knob and the upper surface of said cover, a rod rotating mechanism comprising a sleeve rotatably received on said rod adjacent the lower end, means for preventing axial movement of said sleeve on said rod, a one-way clutch in said sleeve engaging said rod, whereby upon rotation of said sleeve in one direction, said rod will be rotated through said spiral spring and upon rotation of said sleeve in the opposite direction said rod will remain fixed and radially projecting studs on said sleeve engaging said spiral grooves to rotate said sleeve upon reciprocation of said rod and a cutter blade assembly fixed to the lower end of said rod, said assembly comprising a downwardly facing channel member secured intermediate the length thereof to the lower end of said rod, outwardly extending flanges on the lower edges of the legs of said channel member, opposed pairs of notches in said flanges with the notches in one flange being offset from the notches in the opposite flange, the inner ends of said notches terminating outwardly of the side surfaces of said channel member, a one-piece sinuous knife blade having a serrated lower cutting edge, aligned slots in the upper edges of said blade and inwardly extending opposed locking ears on the side edges of said last named slots, the upper and lower surfaces of said locking ears being beveled, said channel member being disposed in said aligned slots with said locking ears extending inwardly over said flanges in alignment with said notches to lock said blade on said channel member, said blade being slidably received in the slot in said stripper element and said stripper element being rotatable with said blade.

3. A food chopper comprising a cylindrical body shell open at the top and bottom ends, an internal upwardly facing annular shoulder in said shell, angularly spaced axially extending ribs on the inner surface of said shell above said shoulder, upwardly extending angularly spaced projections on said shoulder, a stripper element comprising a bottom wall, a cylindrical sidewall, said element being rotatably supported in said shell on said projection and being spaced from the inner surface of said shell by said ribs, a sinuous slot in said bottom wall providing tapered tongues between adjacent portions of said slot and a reinforcing rib on the upper surface of each tongue, each rib terminating at the free end of the tongue in an upwardly extending tapered ear with the lower sides of said ear merging into the ends and side edges of the tongue, a removable cover for said shell and stripper element, said cover having a centrally located vertical aperture, a downwardly extending hollow boss on said cover concentric with said aperture and a spiral groove in the inner surface of said boss, a pushrod slidably received in said aperture, a hand engaging knob on the upper end of said rod, a compression spring on said rod between said knob and the upper surface of said cover, a rod rotating mechanism comprising a sleeve rotatably received on said rod adjacent the lower end, means for preventing axial movement of said sleeve on said rod, a one-way clutch in said sleeve engaging said rod, whereby upon rotation of said sleeve in one direction, said rod will be rotated through said clutch and upon rotation of said sleeve in the opposite direction said rod will remain fixed and radially projecting studs on said sleeve engaging spiral grooves to rotate said sleeve upon reciprocation of said rod and the cutter blade assembly fixed to the lower end of said rod, said assembly comprising a downwardly facing channel member secured intermediate the length thereof to the lower end of said rod, outwardly extending flanges on the lower edges of the legs of said channel member, opposed pairs of notches in said flanges with the notches in one flange being offset from the notches in the opposite flange, the inner ends of said notches terminating outwardly of the side surfaces of said channel member, a one-piece sinuous knife blade, aligned slots in the upper edges of said blade and inwardly extending opposed locking ears on the side edges of said last named slots, the upper and lower surfaces of said locking ears being beveled, said channel member being disposed in said aligned slots with said locking ears extending inwardly over said flanges in alignment with said notches to lock said blade on said channel member, said blade being slidably received in the slot in said stripper element and said stripper element being rotatable with said blade.

4. A food chopper comprising a cylindrical body shell open at the top and bottom ends, an internal upwardly facing annular shoulder in said shell, angularly spaced axially extending ribs on the inner surface of said shell above said shoulder, upwardly extending angularly spaced projections on said shoulder, a stripper element comprising a bottom wall, a cylindrical side wall, said element being rotatably supported in said shell on said projections and being spaced from the inner surface of said shell by said ribs and a sinuous slot in said bottom wall providing tapered tongues between adjacent portions of said slot, a removable cover for said shell and stripper element said cover having a centrally located vertical aperture, a downwardly extending hollow boss on the said cover concentric with said aperture and a plurality of spiral grooves is the inner surface of said boss, a pushrod slidably received in said aperture, a hand engaging knob on the upper end of said rod, a compression spring on said rod between said knob and the upper surface of said cover, a rod rotating mechanism comprising a sleeve rotatably received on said rod adjacent the lower end, means for preventing axial movement of said sleeve on said rod, a one-way clutch on said sleeve engaging said rod, whereby upon rotation of said sleeve in one direction said rod will be rotated through said clutch and upon rotation of said sleeve in the opposite direction said rod will remain fixed and radially projecting studs on said sleeve engaging said spiral grooves to rotate said sleeve upon reciprocation of said rod and a cutter blade assembly fixed to the lower end of said rod, said assembly comprising a downwardly facing channel member secured intermediate the length thereof to the lower end of said rod, outwardly extending flanges on the lower edge of said channel member, opposed pairs of notches in said flanges with the notches in one flange being offset from the notches in the opposite flange, the inner ends of said notches terminating outwardly of the side surfaces of said channel member, a one-piece sinuous knife blade, aligned slots in the upper edges of said blade and inwardly extending opposed locking ears on the side edges of said last named slots, the upper and lower surfaces of said locking ears being beveled, said channel member being disposed in said aligned slots with said locking ears extending inwardly over said flanges in alignment with said notches to lock said blade on said channel member, said blade being slidably received in the slot in said stripper element and said stripper element being rotatable with said blade.

5. A food chopper comprising a cylindrical body shell open at the top and bottom ends, an internal upwardly facing annular shoulder in said shell, a stripper element comprising a bottom wall, a cylindrical sidewall, said element being rotatably supported in said shell on said shoulder and a sinuous slot in said bottom wall providing tapered tongues between adjacent portions of said slot, a removable cover for said shell and stripper element, said cover having a centrally located vertical aperture, a downwardly extending hollow boss on said cover concentric with said aperture and a plurality of spiral grooves in the inner surface of said boss, a pushrod slidably received in said aperture, a hand engaging knob on the upper end of said rod, a compression spring on said rod between said knob and the upper surface of said cover, a rod rotating mechanism comprising a sleeve rotatably received on said rod adjacent the lower end, means for preventing axial movement of said sleeve on said rod, a one-way clutch in said sleeve engaging said rod, whereby upon rotation of said sleeve in one direction said rod will be rotated through said clutch and upon rotation of said sleeve in the opposite direction said rod will remain fixed and radially projecting studs on said sleeve engaging said spiral grooves to rotate said sleeve upon reciprocation of said rod and a cutter blade assembly fixed to the lower end of said rod, said assembly comprising a downwardly facing channel member secured intermediate the length thereof to the lower end of said rod, outwardly extending flanges on the lower edge of said channel member, opposed pairs of notches in said flanges with the notches in one flange being offset from the notches in the opposite flange, the inner ends of said notches terminating outwardly of the side surfaces of said channel member, a fixed sinuous knife blade, aligned slots in the upper edges of said blade and inwardly extending opposed locking ears on the side edges of said last named slots, said channel member being disposed in said aligned slots with said locking ears extending inwardly over said flanges in alignment with said notches to lock said blade on said channel member, said blade being slidably received in the slots in said stripper element and said stripper element being rotatable with said blade.

6. A food chopper comprising a cylindrical body shell open at the top and bottom ends, an internal upwardly facing annular shoulder in said shell, a stripper element comprising a bottom wall, a cylindrical sidewall, said element being rotatably supported in said shell on said shoulder and a sinuous slot in said bottom wall providing tapered tongues between adjacent portions of said slot, a removable cover for said shell and stripper element, said cover having a centrally located vertical aperture, a downwardly extending hollow boss on said cover concentric with said aperture and a plurality of spiral grooves in the inner surface of said boss, a pushrod slidably received in said aperture, a hand engaging knob in the upper end of said rod, a compression spring on said rod between said knob and the upper surface of said cover, a rod rotating mechanism comprising a sleeve rotatably received on said rod adjacent the lower end, means for preventing axial movement of said sleeve on said rod, a one-way clutch in said sleeve engaging said rod, whereby upon rotation of said sleeve in one direction said rod will be rotated through said clutch and upon rotation of said sleeve in the opposite direction said rod will remain fixed and radially projecting studs on said sleeve engaging said spiral grooves to rotate said sleeve upon reciprocation of said rod and a cutter blade assembly fixed to the lower end of said rod said assembly comprising a downwardly facing channel member secured intermediate the length thereof to the lower end of said rod, outwardly extending flanges on the lower edges of said channel member, opposed pairs of notches in said flanges, a sinuous knife blade, aligned slots in the upper edges of said blade and inwardly extending opposed locking ears on the side edges of said last named slots, said channel member being disposed in said aligned slots with said blade engaging said notches and said locking ears extending inwardly over said flanges to lock said blade on said channel member, said blade being slidably received in the slot in said stripper element and said stripper element being rotatable with said blade.

References Cited in the file of this patent
UNITED STATES PATENTS

| | | |
|---|---|---|
| 2,782,826 | Zysset | Feb. 26, 1957 |
| 2,787,308 | Popeil | Apr. 2, 1957 |